United States Patent [19]
Washington

[11] Patent Number: 5,563,936
[45] Date of Patent: Oct. 8, 1996

[54] LOCKOUT TELEPHONE

[76] Inventor: Wayne K. Washington, 150-20 119th Rd., Jamaica, N.Y. 11434

[21] Appl. No.: 485,281

[22] Filed: Jun. 7, 1995

[51] Int. Cl.⁶ ........................................ H04M 1/66
[52] U.S. Cl. .................... 379/200; 379/445; 379/355; 379/184; 379/216
[58] Field of Search ........................ 379/200, 201, 379/188, 189, 198, 184, 199, 355, 445, 216

[56] References Cited

U.S. PATENT DOCUMENTS

| | | |
|---|---|---|
| 3,702,903 | 11/1972 | Barton . |
| 4,297,534 | 10/1981 | Epstein et al. ........................ 379/200 |
| 4,451,713 | 5/1984 | Wittes . |
| 4,453,042 | 6/1984 | Wolf et al. ............................. 379/200 |
| 4,482,787 | 11/1984 | Sagara et al. ........................ 379/200 |
| 4,860,339 | 8/1989 | D'Agosto, III et al. ............. 379/355 |
| 4,866,764 | 9/1989 | Barker, III ............................ 379/355 |
| 4,924,499 | 5/1990 | Serby .................................... 379/200 |
| 4,924,512 | 5/1990 | Sizemore et al. .................... 379/200 |
| 4,965,459 | 10/1990 | Murray . |
| 4,975,943 | 12/1990 | Weber et al. ......................... 379/200 |
| 5,029,197 | 7/1991 | Hashimoto ............................ 379/355 |
| 5,200,995 | 4/1993 | Gaukel et al. . |

FOREIGN PATENT DOCUMENTS 61-179646A  8/1986  Japan ............................. H04M 1/66

*Primary Examiner*—Krista M. Zele
*Assistant Examiner*—Scott Wolinsky
*Attorney, Agent, or Firm*—Michael I. Kroll

[57] ABSTRACT

A lockout telephone comprising a keyswitch for controlling the operation of the telephone's push button keypad and speed dial buttons. The telephone can have a keyswitch with either ON and OFF positions or ON, SPEED DIAL ONLY, and OFF positions. When the keyswitch is in the ON position, the telephone is fully operational. When the keyswitch is in the SPEED DIAL ONLY position, only the speed dial buttons are operational. When the keyswitch without a SPEED DIAL ONLY position is in the OFF position, only the the keypad is inoperative. When the keyswitch with ON, SPEED DIAL ONLY, and OFF positions is in the OFF position, both the keypad and speed dial buttons are inoperative. The lockout telephone can also have an emergency dial button which is always operational, regardless of the keyswitch position.

8 Claims, 2 Drawing Sheets

LOCKOUT TELEPHONE

BACKGROUND OF THE INVENTION

The instant inventions relates, generally, to the field of telecommunications, and, more specifically, to devices that limit unauthorized access to telephone service.

Unauthorized use of telephone service is a growing and troublesome problem. Such use can cause great expense and can tie up telephone lines needed for more important use, such as emergencies. In the era of dial type telephones, simple locks were installed into one of the dial holes to prevent rotation of the dial and, therefore, dialing itself. However, since the introduction of push button telephones using keypads, no method has proved to be equally effective.

Numerous devices which limit unauthorized access to telephone service have been provided in prior art. While these units may be suitable for the particular purpose to which they address, they would not be as suitable for the purposes of the present invention as heretofore described.

SUMMARY OF THE INVENTION

It is, therefore, a primary object of the present invention to provide a lockout telephone that provides normal operation when an integral keyswitch is in the ON position.

Another object of the present invention is to provide a lockout telephone that prohibits the user from dialing out when the keyswitch is in the OFF position.

Yet another object of the present invention is to provide a lockout telephone that prohibits the user from dialing out when the keyswitch is in the SPEED DIAL ONLY position but enables the user to dial out using the speed dial buttons, or an optional 911 emergency button.

A yet further object is to provide a lockout telephone that is simple to use, and inexpensive to fabricate.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
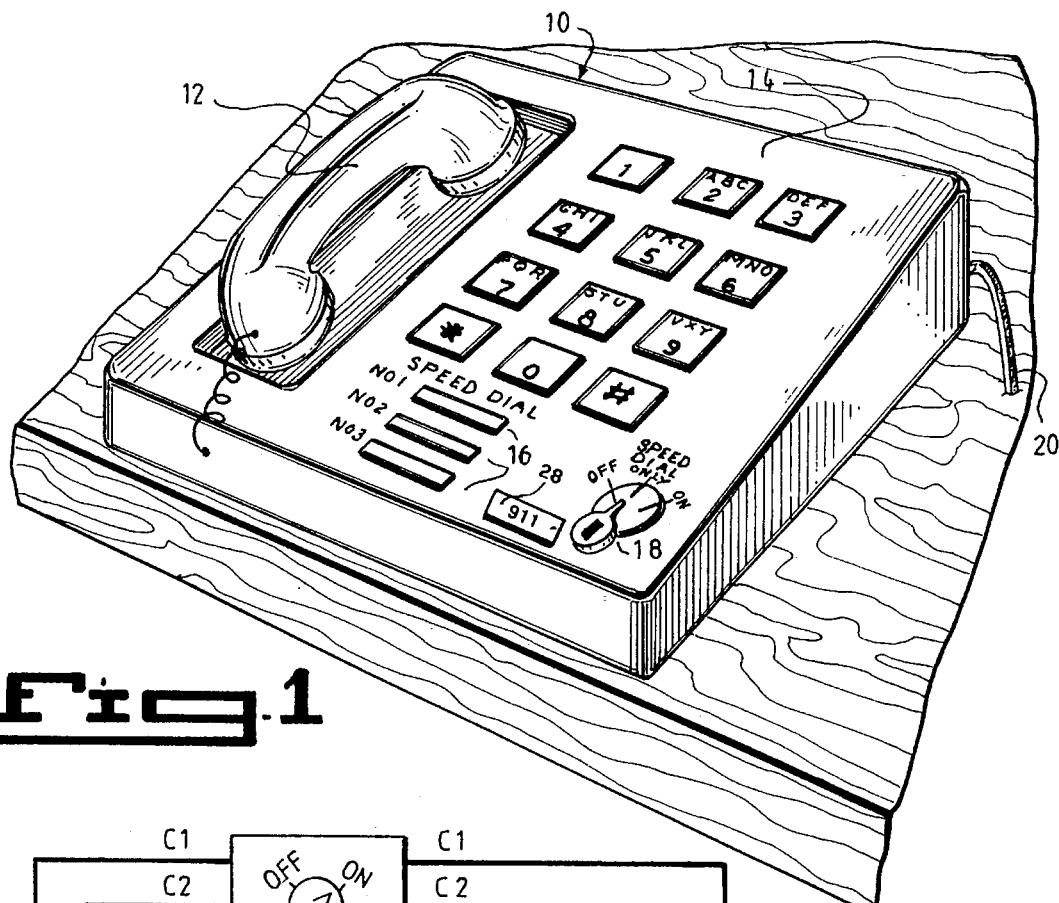
FIG. 1 is a three dimensional view of the invention showing the lockout feature embodiment with three positions: "Off", "Speed Dial Only", and "On".

There are two embodiments of the invention. The embodiment using a two-position ON/OFF keyswitch is illustrated in FIG. 2. The embodiment using a three-position ON/SPEED DIAL ONLY/OFF keyswitch is illustrated in FIGS. 1 and 3.

In FIG. 2, keypad 14 is used to dial telephone numbers and access codes as in conventional telephones. The output of a keypad is normally input to a keyboard interface and decoder such as 22. The output of the keypad contains signals in a matrix consisting of rows and columns. As shown, rows 1–4 (R1,R2,R3,R4) are directly connected to keyboard interface and decoder 22. However, columns 1–3 (C1,C2,C3) are connected to keyboard interface and decoder 22 via keyswitch 24. When keyswitch 24 is in the ON position the keypad works normally and outgoing calls may be made. When the keyswitch is in the OFF position, the connections between keypad 14 and keyboard interface and decoder 22 are interrupted such that keypad 14 is inoperative. Similarly, instead of interrupting the column lines, the row lines could have been interrupted with the same effect. Speed dial buttons #1, #2, and #3 (numeral 16) are always connected to the keyboard interface and decoder 22 and so are always operative so that telephone numbers programmed into the keyboard interface and decoder 22 can be autodialed. Likewise, an optional nonvolatile memory 26 and "911" button 28 are connected to keyboard interface and decoder 22 so that emergency calls can be easily autodialed over telephone line 20 regardless of the setting of keyswitch 18. A handset 12 is provided.

Figure 2:
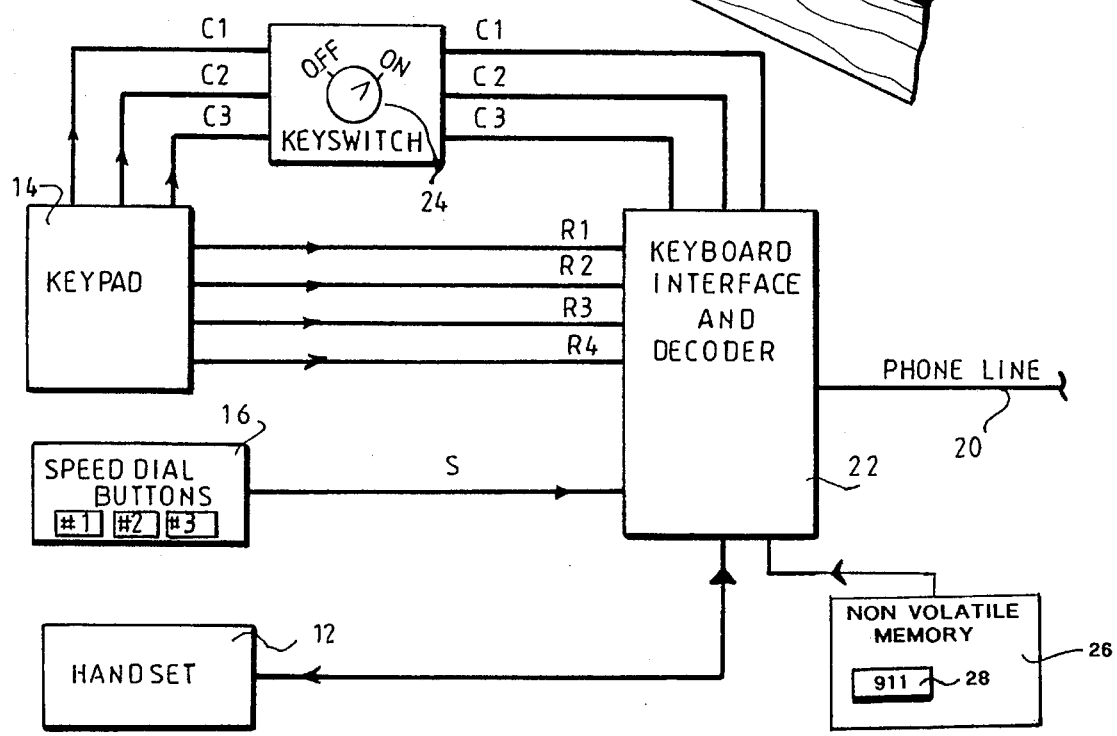
FIG. 2 is an electronic block diagram of the invention showing the lockout feature embodiment with two positions: "Off" and "On".
Figure 3:
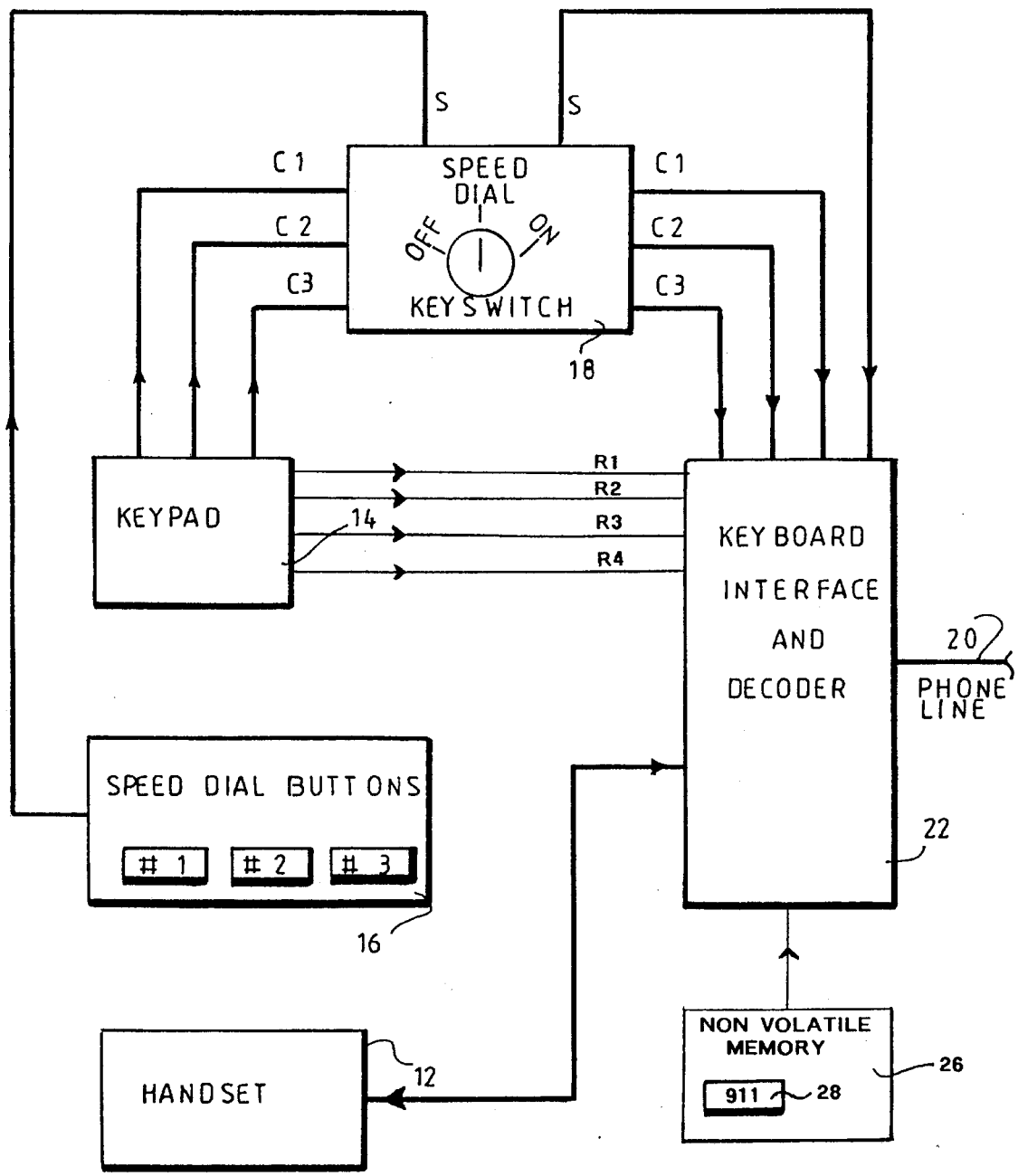
FIG. 3 is an electronic block diagram of the invention showing the lockout feature embodiment with three positions: "Off", "Speed Dial Only", and "On".

The embodiment of the lockout telephone 10, illustrated in FIGS. 1 and 3, is the same as described above except that the keyswitch 18 has three positions OFF, SPEED DIAL, and ON and the speed dial buttons #1, #2, #3 (numeral 16) is also connected to keyboard interface and decoder through keyswitch 18. In the OFF position, keyswitch 18 interrupts the connections between keypad 14 and keyboard interface and decoder 22, and also interrupts the connections between speed dial buttons 16 and keyboard interface and decoder 22 so both the keypad and the speed dial buttons are inoperative. In the SPEED DIAL ONLY position, keyswitch 18 interrupts the connection between keypad 14 and keyboard interface and decoder 22, but connects speed dial buttons 16 to keyboard interface and decoder 22, thereby rendering keypad 14 inoperative but allowing use of the speed dial buttons 16. In the OFF position both the keypad 14 and the speed dial buttons 16 are rendered inoperative. Regardless of the keyswitch 18 position, the "911" button 28 is operative.

LIST OF REFERENCE NUMERALS UTILIZED IN THE DRAWINGS

10 Lockout Telephone
12 Telephone Handset
14 Keypad
16 Speed Dial Buttons: No. 1, No. 2, No. 3
18 Keyswitch (3 Position)
20 Telephone Line
22 Keyboard Interface and Decoder
24 Keyswitch (2 Position)
26 Nonvolatile Memory
28 "911" Button It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A lockout telephone comprising:
   a. telephone keypad means to input telephone numbers and code sequences;
   b. a telephone handset;
   c. telephone line interface means;
   d. keyboard interface and decoder means electrically coupled to said keypad means, said handset and said telephone line interface means;
   e. speed dial button means electrically coupled to said keyboard interface and decoder means such that when a speed dial button is depressed, a pre-programmed dialing sequence is initiated by said keyboard interface and decoder means and sent over a telephone line via said telephone line interface means; and
   f. keyswitch means electrically coupled to said keyboard interface and decoder means and either the column connections or the row connections of said keypad means, whereby said keypad means is operative when said keyswitch means is in an ON position, said keypad means is inoperative when said keyswitch means is in an OFF position, and said speed dial button means is always operative, regardless of the keyswitch means position.

2. A lockout telephone, as recited in claim 1, wherein when said keyswitch means is electrically coupled to said column connections of said keypad means, said keyswitch means interrupts said column connections when in said OFF position.

3. A lockout telephone, as recited in claim 1, wherein when said keyswitch means is electrically coupled to said row connections of said keypad means, said keyswitch means interrupts said row connections when in said OFF position.

4. A lockout telephone, as recited in claim 1, further comprising nonvolatile memory means and an associated push button, said nonvolatile memory means electrically coupled to said keyboard interface and decoder means, whereby depression of said associated push button enables said lockout telephone to dial a telephone number permanently stored in said nonvolatile memory means over said telephone line regardless of the keyswitch means position.

5. A lockout telephone comprising:
   a. telephone keypad means to input telephone numbers and code sequences;
   b. a telephone handset;
   c. telephone line interface means;
   d. keyboard interface and decoder means electrically coupled to said keypad means, said handset and said telephone line interface means;
   e. speed dial button means electrically coupled to said keyboard interface and decoder means such that when a speed dial button is depressed, a pre-programmed dialing sequence is initiated by said keyboard interface and decoder means and sent over a telephone line via said telephone line interface means; and
   f. keyswitch means electrically coupled to said keypad means, said keyboard interface and decoder means, and said speed dial button means, whereby both said keypad means and speed dialer means are operative when said keyswitch means is in an ON position, only said speed dialer means is operative when said keyswitch means is in a SPEED DIAL ONLY position, and said keypad means and speed dial button means are both inoperative when said keyswitch means is in an OFF position.

6. A lockout telephone, as recited in claim 5, wherein said keyswitch means interrupts column connections between said keypad means and said keyboard interface and decoder means when in said OFF position.

7. A lockout telephone, as recited in claim 5, wherein said keyswitch means interrupts row connections between said keypad means and said keyboard interface and decoder means when in said OFF position.

8. A lockout telephone, as recited in claim 5, further comprising nonvolatile memory means and an associated push button, said nonvolatile memory means electrically coupled to said keyboard interface and decoder means, whereby depression of said associated push button enables said lockout telephone to dial a telephone number permanently stored in said nonvolatile memory means over said telephone line, regardless of the keyswitch means position.

* * * * *